L. B. OLNEY.
COLLAPSIBLE AUTOMOBILE RIM.
APPLICATION FILED SEPT. 13, 1919.

1,350,262.

Patented Aug. 17, 1920.

INVENTOR,
L. B. Olney
Vernon E. Hodges
her Attorney

UNITED STATES PATENT OFFICE.

LILLIAN BERTHA OLNEY, OF SAN FRANCISCO, CALIFORNIA, ASSIGNOR OF ONE-HALF TO FOSTER WEEKS AND FRANK BERRY, BOTH OF SAN FRANCISCO, CALIFORNIA.

COLLAPSIBLE AUTOMOBILE-RIM.

1,350,262.   Specification of Letters Patent.   Patented Aug. 17, 1920.

Application filed September 13, 1919. Serial No. 323,562.

*To all whom it may concern:*

Be it known that I, LILLIAN BERTHA OLNEY, a citizen of the United States, residing at San Francisco, in the county of San Francisco and State of California, have invented new and useful Improvements in Collapsible Automobile-Rims, of which the following is a specification.

The invention relates more particularly to detachable rims for pneumatic automobile tires.

The objects of the invention are to reduce to a minimum the labor, and to save undue wear and tear on the casing, in detaching the rim from the tire; to reduce the number of operations in its manufacture, as compared with other so-called collapsible rims; and to produce a rim of greater inherent strength, simplicity, and durability.

In this specification and the annexed drawing, the invention is described and illustrated in the form I consider to be the best, but it is to be understood that the invention is not limited to such form, because it may be embodied in other forms, and it is also to be understood that in and by the claims following the description it is desired to protect the invention in whatever form it may be embodied, according to the size and character of the rim to be manufactured.

Pneumatic tires are constructed to withstand an internal pressure of 80 pounds or more to the square inch. To prevent circumferential or diametrical enlargement they are provided with clencher beads, reinforcing cables, or other devices offering resistance to such enlargement. It is necessary that these beads or devices fit snugly into the channel of the supporting rim. It is very difficult and tedious to separate them, except by such means hereinafter described, as are embodied in this invention.

Figure 1:
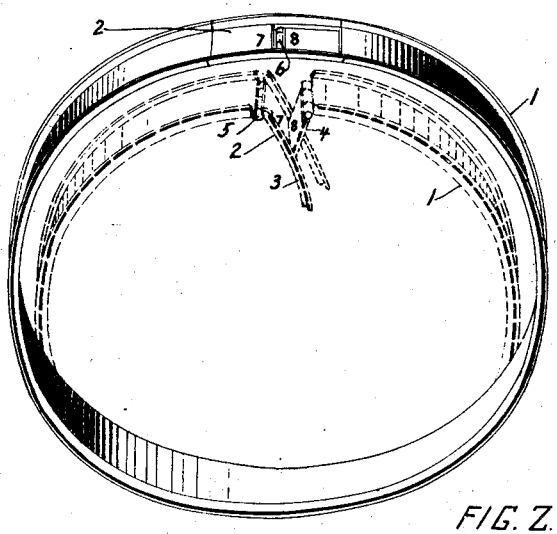
Figure 2:
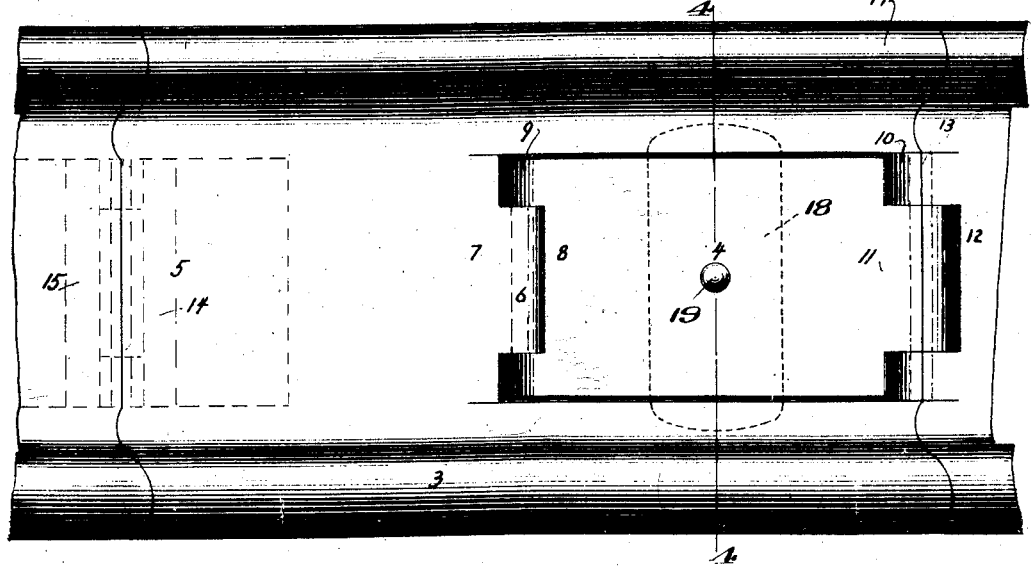
Figure 3:
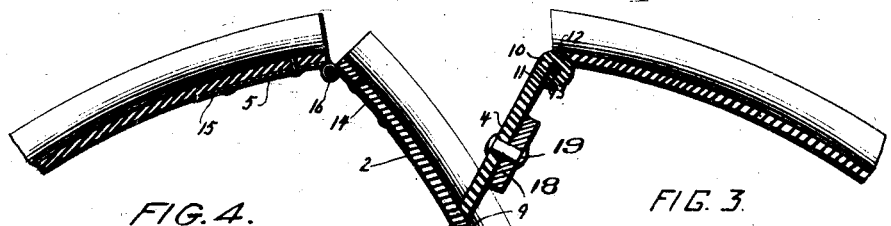
Figure 4:
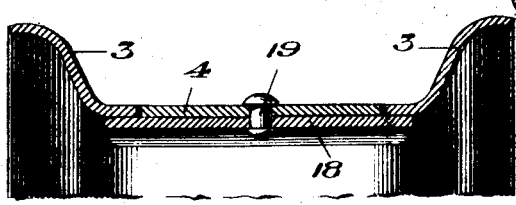

In the accompanying drawing, Figure 1 is a perspective view of an automobile tire rim constructed in accordance with my invention, shown in solid lines in its normal position when in use on a vehicle, and in dotted lines in a collapsed position; Fig. 2 is a plan view of the collapsible portion of the rim from above showing the position and form of the segments; Fig. 3 is a sectional view of the same in the collapsed position; and Fig. 4 is a transverse section on line 4—4 of Fig. 2.

Referring to the drawing, 1 indicates an automobile rim, 2 a collapsible section of the rim, 3 a segment thereof containing long arms of the clencher channel of the rim, 4 a tongue-like segment of the rim which is left free after the segment 3 has been cut, 5 an applied hinge which fastens the segment 3 to the end of the rim 1, 6 a hinge made from the mortised end 7 of the segment 3 and the mortised end 8 of the segment 4 held together by a pintle pin 9. 10 indicates a hinge made from the mortised end 11 of the segment 4 and the mortised end 12 of the rim segment 1, held in place by a pintle 13, hinging segments 1 and 4. Hinge 5 is made by bending back upon segment 3 and there riveting or electric welding a piece of metal 14 to the end of segment 3, and also bending back upon the end of the rim 1 at 5 a metal piece 15 which is there riveted or electric welded together and held in place by the pintle pin 16.

The mode of use of my improved rim is as follows: The rim segment 1 is slightly compressed so that, when sufficient pressure is brought to bear at the point 17, which is the end of the arm on segment 3, and the knee of the hinged portion is slightly bent at 6, the compression will then cause a complete and easy collapse of the entire segment 2. This collapse decreases the size of the rim according to the lengths of the collapsible segments 3 and 4, so that the tire may be removed and replaced with the greatest ease and rapidity, and with a minimum of wear and tear on the tire. When the tire has been refitted to the rim, the collapsible section may then be forced into position by exerting pressure at 6, which will expand the gap between 5 and 10, and finally allow the collapsible section 2 to slip into its normal position as shown in solid lines in Fig. 1.

While collapsing the air must have been released from the tire, so that all the force exerted tends to collapse the segments 3 and 4 of section 2, instead of being resisted by the column of air in the tire. The position and construction of the segment 3 with the long arms of the clencher channel intact causes this portion of the rim to act as a lever, which reduces to a minimum the pressure necessary at the point 17 to collapse the rim. And also, because both segments 3 and 4 may be collapsed this reduces the length of both of the arms to the shortest possible length, by which the diameter of the rim may be made small enough to allow the tire to be taken off with ease, thereby maintaining the greatest possible inherent strength of the rim. The shortness of these segments also reduces the leverage wear on the hinges at 5, 6, and 10, thereby lengthening the life of the rim. The fact that there are also few applied parts enables the manufacturer to produce the rim by stamping and press processes for the most part, there being only two parts at 5 which must be welded to the rim.

As a means of locking section 2 against collapse, which might result from the pressure of the inflated tire, I employ a button 18 which is pivoted to the segment 4 by rivet 19, as shown in Figs. 2, 3 and 4. When this is swung to the position shown in dotted lines in Fig. 2, and in full lines in Fig. 4, the segments are locked; and when it is desired to break the lock, the button 18 is turned a quarter of a circle or at right-angles to the position shown in Figs. 2 and 4, so that its ends are out of the way and do not overlap the inner edges of the segments 3.

I claim:—

1. A collapsible automobile rim including a flanged major section and a flanged minor section hinged at one end of the major section, the minor section recessed back from one end, and a plate having one end hinged at the inner end of the recess and the other end hinged to one end of the major section, said plate of a length to cause the flanges at the end of the minor section to abut the flanges at the end of the major section when the rim is expanded.

2. A collapsible rim comprising a section of radius less than the radius of the complete rim and having non-continuous ends, and two segments of substantially equal lever lengths between said ends, hinged at one end respectively to said ends and at the other end to one another, the point where said segments are hinged together being substantially midway the length of one of the segments, whereby projecting lever ends are formed for manipulation in expanding and locking the rim, and a button pivoted to one segment in position for its ends to take under the inner edges of the lever ends of the other segment when the rim is expanded in order to hold it in locked position.

LILLIAN BERTHA OLNEY.